United States Patent [19]

Detinko et al.

[11] 4,425,523

[45] Jan. 10, 1984

[54] CORE SPRING SUPPORT SYSTEM FOR A DYNAMOELECTRIC MACHINE

[75] Inventors: Felix M. Detinko, Pittsburgh; Nicholas S. Kosanovich, Forest Hills; John A. Levino, Sewickley Township, Westmoreland County, all of Pa.

[73] Assignee: Westinghouse Electric Corp., Pittsburgh, Pa.

[21] Appl. No.: 385,164

[22] Filed: Jun. 4, 1982

[51] Int. Cl.³ .............................................. H02K 1/12
[52] U.S. Cl. ....................................... 310/258; 310/89
[58] Field of Search ....................... 310/42, 51, 89, 91, 310/258, 259

[56] References Cited

U.S. PATENT DOCUMENTS

| | | | |
|---|---|---|---|
| 2,320,843 | 6/1943 | Baudry | 310/258 |
| 2,561,994 | 7/1951 | Rashevsky et al. | 310/258 |
| 2,811,659 | 11/1957 | Barlow et al. | 310/258 |
| 2,846,603 | 8/1958 | Webster et al. | 310/258 |
| 3,293,464 | 12/1966 | Spirk | 310/258 |
| 3,531,667 | 9/1970 | Barton et al. | 310/258 |

Primary Examiner—Donovan F. Duggan
Assistant Examiner—Anita M. Ault
Attorney, Agent, or Firm—William D. Lanyi

[57] ABSTRACT

A core support system is described by which the core structure and frame structure of a dynamoelectric machine can be manufactured independently in parallel operations and later assembled. The support system provides radially resilient support of the core structure while maintaining tangential stiffness by utilizing axially extending spring bars disposed in a cylindrical configuration about the inner periphery of the stator frame structure. The spring bars are rigidly attached to annular frame rings and can be radially deformed to be in firm contact with building bars of the core structure which can be axially slid into the frame during assembly.

10 Claims, 4 Drawing Figures

CORE SPRING SUPPORT SYSTEM FOR A DYNAMOELECTRIC MACHINE

BACKGROUND OF THE INVENTION

The present invention relates generally to a stator spring support system for a dynamoelectric machine and, more specifically, to a spring support system which permits an electric generator stator to be manufactured in two independent segments which can be produced by parallel operations.

As the rotor of an electric generator rotates, its magnetic field revolves in unison with it. This magnetic field exerts a force on the generator's stator core. The core of a machine having a two-pole rotor experiences an elliptical deformation which follows the rotation of the rotor during operation. In a two-pole machine, the core is thus vibrated at a frequency which is twice that of the rotational speed of the rotor which is typically 3600 RPM.

This cyclic distortion causes objectionable vibrations in the stator frame which can be transmitted to the machine foundations if the stator core is rigidly mounted within the stator frame. If springs are used to provide a means for resiliently mounting the core to the stator frame, the transmission of these vibrations to the foundation can be minimized. U.S. Pat. No. 2,320,843, which issued to Baudry on June 1, 1943, discloses a core mounting system which utilizes a plurality of springs to resiliently support the core within the stator frame. The springs in the Baudry patent are made from flat plates which are mounted in such a way as to provide resiliency in the radial direction while providing considerable stiffness and rigidity in the tangential direction. The radial resiliency serves to absorb the above-described vibrations while the tangential rigidity supports the core's weight and holds it in position.

U.S. Pat. No. 2,561,994, which issued to Rashevsky, et al. on July 24, 1951, discloses a core support system similar to that of Baudry, but which utilizes sets of four springs which are all mounted to extend at 45 degrees to vertical. As in the Baudry patent, the springs are mounted to provide radial resiliency with tangential stiffness.

U.S. Pat. No. 2,811,659, which issued to Barlow et al. on Oct. 29, 1957, discloses a spring support system which utilizes axially extending spring bars that are attached to the stator frame at points along its length. The core is bolted to points along the spring bar which are located axially between the above-mentioned attaching points and radial resiliency is provided by the spring bar's deformation at these bolted points. Similarly, radial resiliency can also be achieved by providing tangential slots in the core's building bars as disclosed in U.S. Pat. No. 2,846,603 issued to Webster et al. on Aug. 5, 1958.

Present methods of supporting the core of an electric generator utilize springs, as described above, require that the stator frame structure be completed prior to the laminated stator core being stacked coaxial to it and located internally thereto. This essentially necessitates that the stator frame and core be manufactured serially with a significantly disadvantageous use of facilities and resulting in a cumbersome manufacturing schedule. When plate-like springs are used, the design of inner and outer stator segments is frustrated by the strength requirements of the outer frame segment. This occurs partially because of the tangential stiffness of the spring plates. When transient forces are exerted on the core, these tangential loads are transmitted directly to the generator frame structure and result in severe reactions therein. For this reason, the frame structure must be built to have significant strength to withstand these forces. This necessitates a construction configuration unsuited to separate core and frame segments which can be assembled after their individual manufacture.

Significant economics can be achieved if the stator frame and core can be manufactured in parallel operations and assembled at a later time. It is an object of this invention to provide a stator core support system that provides radial resiliency and limited, but sufficient, tangential stiffness while permitting the stator frame and core to be manufactured in parallel for later assembly.

SUMMARY OF THE PRESENT INVENTION

The present invention relates to a stator core support system which provides radial resiliency and limited, but sufficient, tangential stiffness while permitting the parallel manufacture of the stator frame and core.

In dynamoelectric machines generally and electric generators specifically, the stator core consists of a plurality of laminated punchings which are stacked to form a cylindrical core configuration with a central bore therethrough. In order to provide structural integrity and assure proper alignment of the laminations, a plurality of axially extending building bars are used. Typically, these bars are positioned in a cylindrical association and the individual punchings are stacked cooperatively with them. Usually the punchings are made with recesses which are shaped to fit around the building bars. A proper positioning of these building bars prior to stacking assures a properly configured and accurately built core assembly. The present invention utilizes this technique, but does not require that the building bars be assembled to the stator frame prior to the core stacking operation. Instead, the building bars are supported by a fixture which maintains their position during the core stacking operation. The stator frame is constructed in such a way as to be shaped to receive the preassembled core structure in sliding relation.

The stator frame structure comprises a cylindrical shell member with a plurality of frame rings rigidly connected to its inner surface. Rigidly attached to the frame rings are a plurality of spring bars extending axially within the frame structure and positioned to form a cylindrical association. Each spring bar is supported at its contact points with the frame rings and is unsupported therebetween. It is in these unsupported regions that the spring bars provide radial resiliency by permitting deformation in both the radially inward and outward directions. In order to provide radial resiliency while maintaining limited but sufficient tangential stiffness, the bars are thinner in their radial direction and thicker in their tangential direction.

The radial dimension is chosen to allow radial vibration of the core member to be absorbed and not transmitted through the frame structure to the foundation and the tangential dimension is chosen to provide support for the core member while permitting limited flexibility in order to absorb transient tangential forces which can occur during operation. This absorption of tangential forces dampens their effect on the frame structure and permits the outer frame structure to be built with less stringent strength requirements than would be necessitated if spring plates, as discussed above, were used.

Each spring bar has a radially inward surface shaped to receive a building bar of the core structure in sliding relation. This cooperative association allows a prebuilt inner core assembly to slide into a coaxial and concentric relationship with an outer stator frame member, making possible their parallel manufacture which maximizes scheduling efficiencies and optimum use of production facilities.

The spring bars are designed with boss portions on its radially inner surface. It is in these boss portions that a groove is located which is shaped to receive the core's building bar contact. By localizing the spring bar to building bar contact, the resiliency of the spring bar can be used in an enhanced manner not possible if the spring bars and building bars are in full contact along their entire length. Cooperatively, the contact points between the spring bars and the frame rings are located at points between these boss portions of the spring bars. Also, the spring bars are welded to the frame rings at locations along the spring bar's radially outer surface where raised portions are provided to minimize the effect of their heat affected zones due to welding.

In order to reduce assembly clearances and provide good radial contact between the spring bars of the stator frame and the building bars of the stator core, clamping rings are disposed around the deformable portions of the spring bars axially proximate their boss portions. After assembly, the clamping rings can be used to slightly deform the spring bars radially inward in order to make positive contact with the building bars which they are shaped to receive.

It should be apparent that the present invention enables the stator frame and core to be separately manufactured by parallel operations to achieve significant scheduling advantages while providing the radial resiliency and limited but sufficient tangential stiffness required in the stator core support system of an electric generator.

BRIEF DESCRIPTION OF THE DRAWINGS

The present invention will be more clearly understood from a reading of the description of the preferred embodiment in conjunction with the figures, in which.

DESCRIPTION OF THE PREFERRED EMBODIMENT

Figure 1:
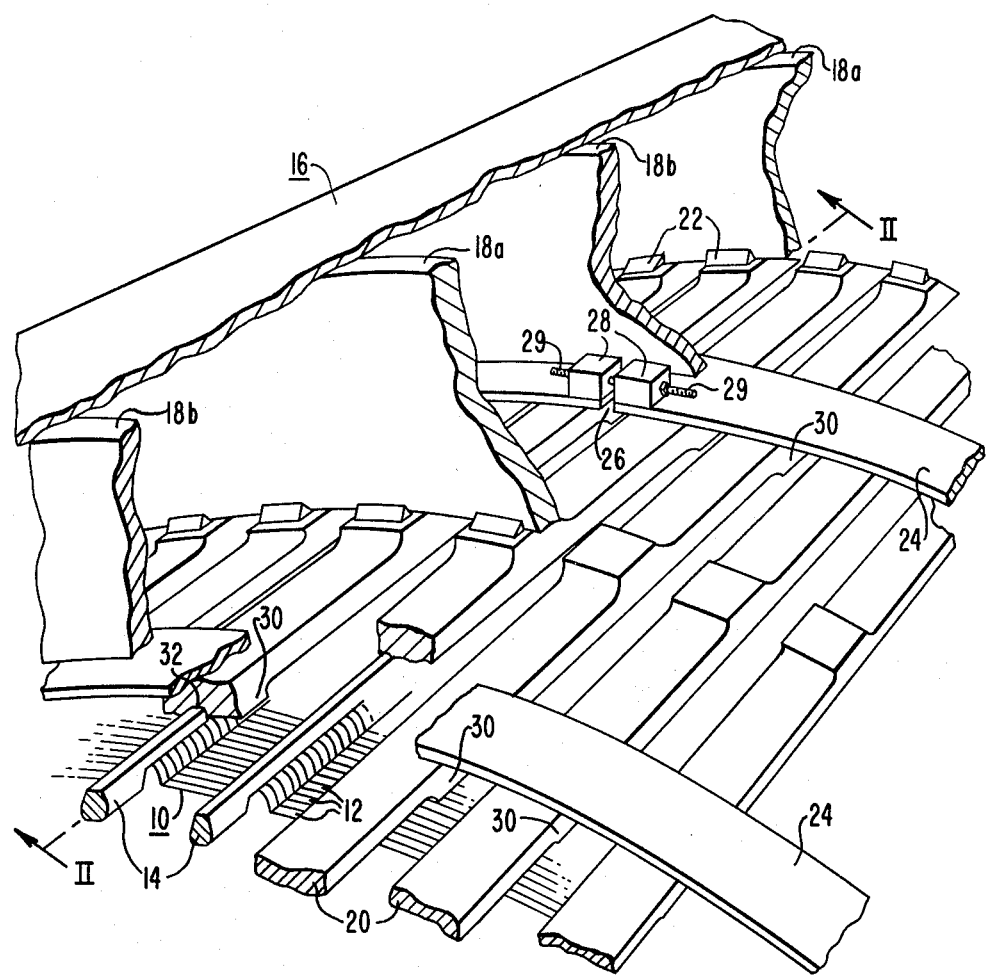
FIG. 1 illustrates the present invention in isometric view.

The present invention, as shown in FIG. 1, provides a means for resiliently supporting a core structure of an electric generator within its stator frame structure. The core 10 comprises a plurality of laminated punchings 12 which are stacked to form a cylindrical core structure. Along the core's outer periphery, a plurality of building bars 14 extend axially to provide alignment and structural support and protrude radially from the core structure.

Located radially outward from the core 10, the stator frame structure comprises an outer cylindrical shell 16 which is a casing of welded plate construction and has a plurality of frame rings, 18a and 18b, attached to its inner surface. These frame rings are essentially identical except that rings 18a are rigidly attached to spring bars 20 whereas rings 18b are not.

Frame rings 18a are connected to the spring bars 20 by welds 22, as shown in FIG. 1, or any other suitable means that will rigidly support the springs bars 20 to the frame structure. It should be apparent that, since the spring bars 20 are not supported in their region proximate frame rings 18b, they remain free to be radially deformed along this portion of their length. In the region where the spring bars 20 can be radially deformed, proximate frame rings 18b, a clamping ring 24 is provided as a means for exerting a radially inward force on the spring bars 20 in order to force them into positive contact with the building bars 14 of the core structure. In order to provide this radially inward force, the clamping rings 24 are provided with a split 26 and means for drawing the termini of the clamping ring 24 tangentially together. This can be accomplished by attaching blocks 28 to the termini and passing a threaded member 29 through a hole in the blocks. Since the clamping rings 24 are free to slide over the radially outer surface of the spring bars 20 tightening the nuts at each end of the threaded member 29 causes the arcuate length of the clamping ring 24 to be reduced and the spring bar 20 is therefore deformed radially inward toward the building bar 14 in the region of the clamping ring 24.

The radially inward surface of the spring bars 20 have a boss portion 30 that has a groove 32 shaped to fit a building bar 14. This provides tangential support for the core while permitting the core to move radially with the spring bar 20. It should be noted that, in FIG. 1, only the boss portion 30 of the spring bars 20 are grooved to fit the building bars 14. This localized contact between the spring bar 20 and the building bar 14 enhances the radial resiliency of the spring support system, however it should be understood that alternate configurations are possible within the scope of the present invention.

Figure 2:
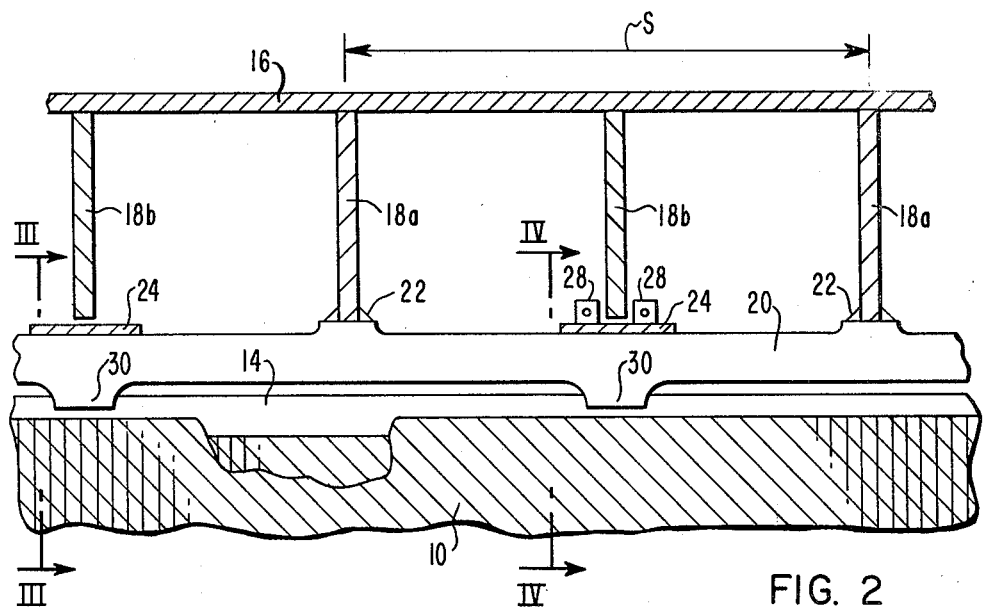
FIG. 2 is a section view of the spring bar of the present invention in relation to other components of the present invention.

FIG. 2 is a section view showing the core structure which comprises the cylindrical core 20 with one of its building bars 14. Radially outward from the core structure is the stator frame structure with its cylindrical shell 16 and frame rings, 18a and 18b. One of the spring bars 20 is shown attached to the frame rings 18a by welds 22. Although not visible in FIG. 2, the boss portion 30 of the spring bar 20 has a groove (reference numeral 32 in FIG. 1) which is shaped to receive the building bar 14 in sliding relation until the spring bar 20 is deformed radially inward to assure firm contact between the building bar 14 and the spring bar 20. As described above, this deformation is accomplished through the use of a clamping ring 24 which is disposed around the cylindrical association of spring bars 20. By tightening, or reducing the effective circumferential length of the clamping ring 24, it exerts a radially inward force on the spring bar 20 and deflects it toward the building bar 14 until a firm contact exists between them. It is important to note that the clamping ring 24 is not attached to the spring bar 20 but, instead, is free to slide along the radially outer surface of the spring bar 20. This sliding relation permits the clamping ring 24 to be tightened without introducing a tangential component of force on the spring bar 20 which would otherwise be moved in a non-radial direction.

It should be noted that the spring bar 20 is rigidly attached to the frame rings 18a, but not to frame rings 18b. This configuration results in the spring bar 20 being unsupported in its region that spans the distance between adjacent supporting frame rings 18a. It is in this region that the spring bar 20 is deformable which not only permits the clamping ring 24 to deflect it inward for contact with the building bar 14 but also provides the radial resiliency of the core support system of the present invention and the limited, but sufficient, tangential stiffness required to support the core structure while allowing some tangential movement in order to absorb transient forces. The precise location of the frame rings 18b is not important in the operation of the present invention other than its effect on the structural integrity of the stator frame and support of the shell 16.

Figure 3:
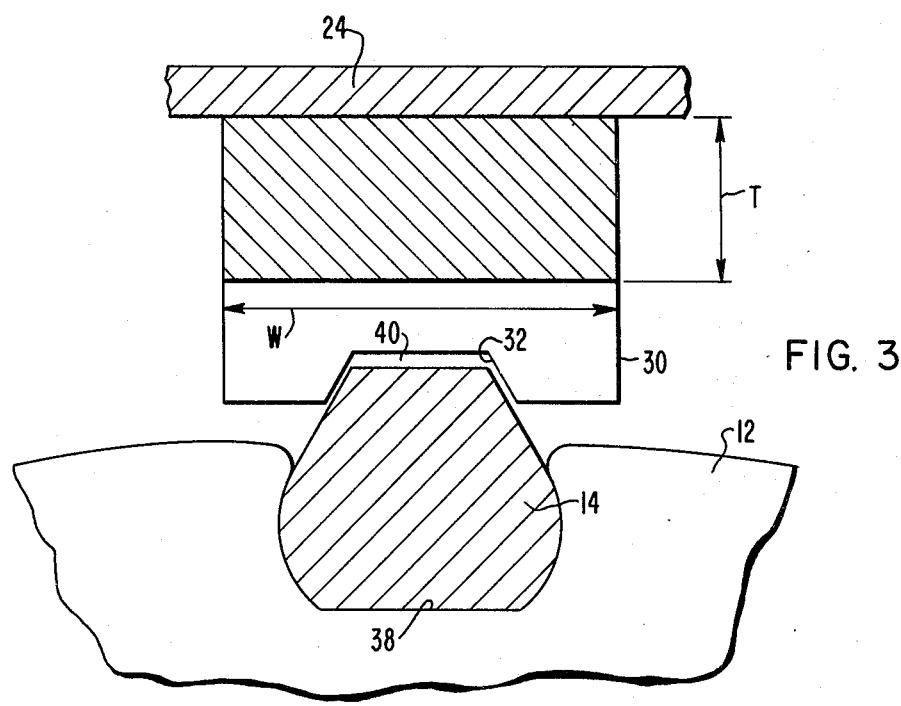
FIG. 3 is a section view of a spring bar and a building bar of the present invention.

FIG. 3 is a section view of the spring bar 20 and building bar 14 of FIG. 2. In FIG. 2, the spring bar 20 is shown with its boss portion 30 which has a channel 32 therein that is shaped to receive the building bar 14. The building bar 14, in turn, is shaped to fit into a punched slot 38 in the core lamination 12. Radially outward from the spring bar 20 is the clamping ring 24 which, when tightened, eliminates the gap 40 between the spring bar 20 and the building bar 14 and provides a firm contact between them.

It should be understood that the spring characteristics of the present invention are a function of its specific dimensions and can be altered to suit particular applications. For example, the thickness T and the width W of the spring bar 20 shown in FIG. 3 are chosen to provide radial resiliency along with limited, but sufficient, tangential stiffness. Also, the span S between the points where the spring bar 20 is rigidly connected to the frame rings 18a (as shown in FIG. 2) determine the resiliency of the present invention, along with the number of spring bars 20 used and the effective radius of their cylindrical association.

When the clamping rings 24 are in a relaxed state, the dimensions of the gap 40 represent the assembly clearance available for inserting the core structure into the stator frame structure. This gap is generally equivalent to one tenth of an inch in the radial direction and a proportional amount on its side segments. The core structure can be made to slide axially into the frame structure followed, sequentially, by a tightening of the clamping rings 24. This deforms the spring bars 20 into firm contact with the building bars 14 and supports the core structure within the stator frame.

Figure 4:
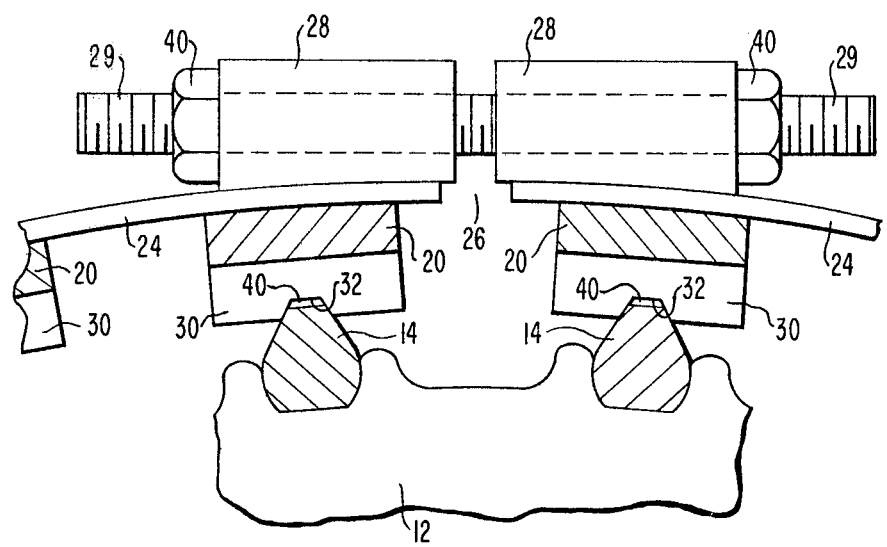
FIG. 4 illustrates the clamping ring of the present invention.

FIG. 4 shows the clamping bar mechanism in greater detail. The spring bars 20 are disposed radially outward from the building bars 14 and are connected to preselected frame rings (not shown in FIG. 4), while the building bars 14 are firmly attached to a plurality of laminations 12 which are stacked to form a cylindrical core structure. Radially outward from the spring bars 20, the clamping ring 24 is disposed and equipped with means for drawing its termini together in its split region 26. In this configuration, two blocks 28 are attached to the ends of the split clamping ring 24 and a threaded member 29 is passed through aligned holes in the blocks 28. By tightening two bolts 40, the blocks 28 can be forced toward each other and the effective circumferential length of the clamping ring 24 can be reduced. The effect of this procedure is to force the spring bar 20 radially inward into firm contact with the building bar 14. The boss portion 30 of the spring bar 20 has a groove 32 shaped to fit over the building bar 14 in firm relation with it, providing radial support to the core structure. This radial deformation eliminates the gap 40 which had formerly provided clearance for the assembly of the core structure into the stator frame structure.

It should be apparent from the above disclosure that the present invention provides a core support system that is radially resilient with limited but sufficient tangential stiffness while permitting the core and frame structures to be independently manufactured in parallel operations. It should also be apparent that, although the preferred embodiment has been described in considerable detail, other embodiments are possible within the scope of the present invention.

What we claim is:

1. A dynamoelectric machine, comprising:
   a stator structure having an outer frame member and an inner core member, said frame member being cylindrical and shaped to receive said core member coaxially therein, said frame member having an outer shell with a plurality of frame rings connected to and extending radially inward from said shell;
   a plurality of building bars extending axially along the outer periphery of said core member, said building bars being connected to said core member and protruding radially from the outer periphery of said core member;
   a plurality of spring bars extending axially along the inner periphery of said frame member and being rigidly connected to said frame rings, the radially inner surface of said spring bars being shaped to receive said building bars in an axially slidable association; and
   means for deforming portions of said spring bars in a radially inward direction, said deforming means being disposed between adjacent of said frame rings.

2. The dynamoelectric machine of claim 1, wherein:
   said deforming means is a clamping ring disposed radially outward from said spring bars and capable of exerting a radially inward force on said spring bars.

3. The dynamoelectric machine of claim 2, further comprising:
   a threaded means for drawing two termini of said clamping ring circumferentially toward one another.

4. The dynamoelectric machine of claim 1, further comprising:
   a raised portion of said spring bar extending radially inward from said spring bar axially proximate said deforming means, said raised portion having a groove therein shaped to receive said building bar.

5. An apparatus, comprising:
   a cylindrical outer member having a cylindrical shell and a plurality of annular rings connected to the inner periphery of said shell;
   a cylindrical inner member;
   a first plurality of bars connected to said inner member, each of said first plurality of bars extending axially along the outer surface of said inner member and protruding radially outward from the outer surface of said inner member;
   a second plurality of bars connected to said annular rings and extending axially within said shell, each of said second plurality of bars being shaped to receive a preselected one of said first plurality of bars in an axially slidable relation; and means for compressing preselected segments of said second plurality of bars radially inward against said first plurality of bars.

6. The apparatus of claim 5, wherein:
said second plurality of bars are capable of resiliently supporting said inner member.

7. A stator structure for an electric generator, comprising:
a cylindrical shell member;
a plurality of annular frame rings connected to and extending radially inward from said shell member;
a plurality of spring bars connected to said annular frame rings and extending axially inside, said plurality of spring bars being disposed in a cylindrical association of said shell;
a cylindrical inner core member;
a plurality of building bars connected to the outer cylindrical surface of said core member, said building bars extending axially and protruding radially outward from said core member, said building bars being arranged in a cylindrical association;
said cylindrical association of building bars describing an outside diameter smaller than the inside diameter described by said cylindrical association of spring bars;
means for deforming preselected portions of said spring bars radially inward against said building bars; and
said cylindrical association of spring bars being shaped to receive said cylindrical association of building bars in a slidable, coaxial association.

8. The structure of claim 7, wherein:
said deforming means is a clamping ring disposed around said cylindrical association of spring bars.

9. The structure of claim 8, wherein:
said clamping ring is less than three hundred and sixty arcuate degrees and comprises means for reducing the circumferential distance between its two termini, thereby decreasing its diametric dimension.

10. A cylindrical support structure, comprising:
an outer cylindrical member;
a first plurality of axially extending bars disposed in a cylindrical association proximate the inner periphery of said outer cylindrical member, each of said first plurality of bars being rigidly attached to said outer cylindrical member at a plurality of preselected points;
an inner cylindrical member;
a second plurality of bars connected to said inner cylindrical member and extending axially along the outer periphery of said inner cylindrical member, each of said second plurality of bars protruding radially outward from said inner cylindrical member; and
means for deforming said first plurality of bars radially inward, said deforming means disposed between adjacent of said preselected attaching points;
each of said first plurality of bars being shaped to receive a preselected one of said second plurality of bars in sliding relation.

* * * * *